(12) United States Patent
Zhu et al.

(10) Patent No.: US 7,503,491 B2
(45) Date of Patent: Mar. 17, 2009

(54) RFID CHIP AND ANTENNA WITH IMPROVED RANGE

(75) Inventors: Shengbo Zhu, San Jose, CA (US); Su Shiong Huang, Bellevue, WA (US)

(73) Assignee: Magnex Corporation, San Jose, CA (US)

( * ) Notice: Subject to any disclaimer, the term of this patent is extended or adjusted under 35 U.S.C. 154(b) by 485 days.

(21) Appl. No.: 11/262,074

(22) Filed: Oct. 29, 2005

(65) Prior Publication Data

US 2007/0095925 A1    May 3, 2007

(51) Int. Cl.
GO6K 7/08 (2006.01)
(52) U.S. Cl. .................. 235/451; 235/492; 343/788; 902/25; 902/26; 340/572.6; 340/572.7
(58) Field of Classification Search .......... 902/25, 902/26; 343/788; 235/451; 340/572.6, 572.7
See application file for complete search history.

(56) References Cited

U.S. PATENT DOCUMENTS

| 5,436,441 | A | * | 7/1995 | Inoue | 235/492 |
|---|---|---|---|---|---|
| 5,606,488 | A | * | 2/1997 | Gustafson | 235/492 |
| 5,756,986 | A | * | 5/1998 | Gustafson | 235/492 |
| 5,986,562 | A | * | 11/1999 | Nikolich | 340/572.7 |
| 6,268,796 | B1 | | 7/2001 | Gnadinger et al. | |
| 6,412,701 | B1 | * | 7/2002 | Kohama et al. | 235/492 |
| 6,606,247 | B2 | | 8/2003 | Credelle et al. | |
| 6,623,579 | B1 | | 9/2003 | Smith et al. | |
| 6,662,430 | B2 | | 12/2003 | Brady et al. | |
| 6,724,347 | B2 | | 4/2004 | Tomomatsu et al. | |
| 6,778,089 | B2 | * | 8/2004 | Yoakum | 340/572.8 |
| 6,837,438 | B1 | * | 1/2005 | Takasugi et al. | 235/492 |
| 6,930,646 | B2 | * | 8/2005 | Yahata et al. | 343/788 |
| 7,088,304 | B2 | * | 8/2006 | Endo et al. | 343/788 |
| 2003/0218073 | A1 | * | 11/2003 | Arimura | 235/492 |
| 2006/0124753 | A1 | * | 6/2006 | Scholz et al. | 235/492 |

FOREIGN PATENT DOCUMENTS

| JP | 2000-48150 A | * | 2/2000 |
|---|---|---|---|
| JP | 2000-293655 A | * | 10/2000 |
| WO | WO 93/18493 A1 | * | 9/1993 |

OTHER PUBLICATIONS

"Maxell RFID System-Coil-on-Chip-The Contactless Solutions" (publication date unknown)-by Maxell Company-discusses the Maxell coil-on-a-chipRFID product.
"The World's Smallest RFID IC" (Hitachi Corporation web page with copyright dates of 2002, 2004) printed from an Internet web site—discusses Hitachi μ-chip, no month available.
"Hitachi to Sell Inexpensive μ-Chip Inlets at Fraction of the Cost of Existing Inlets, Open the Way to Use in Various Applications" press release dated Dec. 2, 2003 by Hitachi Ltd—describes Hitachi μ-Chip.
"Putting Tags on Test Tubes" RFID Journal web site page dated Oct. 11, 2004 describes the use of Maxell Coil-On-A-Chip RFID tags on test tubes.
"Coil-on-Chip RFID Systems" Maxell Corp. web page dated Oct. 11, 2004)- describes Maxell Corp Coil-on-Chip RFID system.
"Reading Between The Lines"EDN Oct. 14, 2004-survey article discussing RFID technology.

* cited by examiner

*Primary Examiner*—Michael G Lee
*Assistant Examiner*—Kristy A Haupt

(57) ABSTRACT

A "coil-on-a-chip" RFID tag having an rfid integrated circuit and an antenna contemporaneously formed on a substrate. The antenna is a helical multiple layer, multi-turn coil having an axis of revolution oriented at an angle, preferably ninety degrees, with respect to the major body plane of the rfid integrated circuit. The coil has a central opening with an annular core of magnetically permeable material. The RFID tag has an increased operating range over known ID tags.

8 Claims, 4 Drawing Sheets

RFID CHIP AND ANTENNA WITH IMPROVED RANGE

BACKGROUND OF THE INVENTION

This invention relates to the field of rfid (radio frequency identification) chip and antenna technology. More particularly, this invention relates to an rfid chip and antenna having an improved range of communication with an associated r.f. interrogation/reading device A typical rfid chip and antenna are usually both incorporated into an ID tag, such as that shown and described in U.S. Pat. No. 6,154,137 issued Nov. 28, 2000, the disclosure of which is hereby incorporated by reference. Generally, an ID tag has the antenna and the rfid chip mounted on or encapsulated in a thin substrate, such as a polyethylene terephthalate (PET) substrate as disclosed in U.S. Pat. No. 6,373,708 B1 issued Apr. 16, 2002, the disclosure of which is hereby incorporated by reference. The antenna is usually a small loop antenna or a dipole antenna, and must be ohmically connected to the rfid chip. The usual loop antenna is a multi-turn planar ohmic conductor formed in any one of several known ways. One such technique is silver paste printing on a suitable substrate, such as the PET substrate noted above. Another known technique for forming a loop antenna is copper deposition on a substrate as practiced by RCD Technology Corporation of Bethlehem, Pa. The size of the coil (coil diameter and thickness) and the number of turns is determined by the requirements of a particular application, including constraints on the physical size of the ID tag. The function of the antenna is to provide electromagnetic transfer of information between the rfid chip and outside interrogation/reader devices, such as a host CPU, a user reading station, or the like; as well as to enable inductive transfer of electrical power from an outside device into the rfid chip to furnish electrical power to the active circuit elements within the rfid chip.

Many types of commercially available rfid chips are known at present, each having the standard internal functional components commonly found in an rfid integrated circuit. Such standard components include an RF and analog section, a CPU, a ROM and an EEPROM (see 1999 IEEE International Solid-State Circuits Conference publication 0-7803-5129-0/99, FIG. 9.1.1: RFID transponder IC block diagram). The rfid chip receives electrical power via the antenna when interrogated by an outside device, and communicates with the outside device using standard protocols, such as the ISO 14443 protocol or the ISO15693 protocol. Prior to installation of an ID tag on an object, information identifying the object to be attached is written into the ROM (read-only memory) incorporated into the rfid chip. Once this information is written once into the ROM, it cannot be written over or otherwise altered by any interrogation device. The rfid chip can be interrogated by an outside interrogation/reader device and can only supply the information to the outside device-i.e, it cannot alter the information stored in the ROM.

ID tags of the type described above having an rfid chip and an antenna are very useful for object tracking and are currently used in a wide variety of such applications. Many more applications of this technology are theoretically possible, but practical implementations have been limited in the past by size and cost constraints. These constraints have been recently addressed by improved semiconductor batch processing techniques to the extent that very small rfid chips and antennae can now be produced at a cost substantially less than the cost of the individual objects to which they are intended to be attached. For example, Hitachi, LTD. of Tokyo, Japan introduced the mu series rfid chip and antenna in 2004, with a chip size of 0.4 mm×0.4 mm and a cost at least one-third less than the price of rfid chips then on the market. Other semiconductor manufacturers have followed suit with their own competitive offerings.

FIG. 1 is a top plan view of a prior art ID tag 10 having an rfid chip 12 and a separate discrete antenna 14, both of which elements are mounted on a substrate 15. The rfid chip 12 is an integrated circuit containing the usual circuitry required for a functional rfid device, and is a separately fabricated device. These integrated circuit devices are typically manufactured using batch processing techniques which are well known to those skilled in the art. In general, multiple copies of the basic device design are built up on a large semiconductor wafer, after which the individual chips are separated from each other and combined with other discrete components.

For the FIG. 1 ID tag 10, the other discrete component is the antenna 14, which enables the rfid chip 12 circuitry to communicate with an outside interrogation device and also enables the electromagnetic transfer of energy into the rfid chip 12 to power the electronic circuitry contained therein. Since the useful operating range of an rf antenna is a direct function of coil area, antenna 14 is ideally a multi-turn coil subtending a much larger area than rfid chip 12 in order to provide as large an effective operating range as possible. Antenna 14 is typically either a separately formed discrete coil which is then adhered to substrate 15, or a metallic layer deposited directly on substrate 15 during formation of the coil.

The ID tag 10 of FIG. 1 is typically constructed by first fabricating the rfid chip 12 and antenna 14 as separate components, mounting components 12 and 14 to substrate 15, and electrically connecting antenna 14 to rfid chip 12. For this purpose, rfid chip 12 is fabricated with two ohmic connection pads 16, 17 to which the free ends 18, 19 of antenna 14 are bonded.

While the process of constructing ID tag 10 appears simple and staightforward, in practice the process is actually quite difficult to perform with a high degree of repeatable accuracy. This difficulty is primarily due to the small dimensions of the connection pads on the rfid chip; the requirement that the free ends 18, 19 of antenna 14 be precisely positioned over pads 16, 17 just prior to the bonding step of the process; and the additional requirement that a precise mechanical and ohmic bond must be made between the antenna ends and the connection pads. It is estimated that the cost of producing an ID tag of the type shown in FIG. 1 is: rfid chip 12: ⅓rd; antenna 14: ⅓rd; assembly: ⅓rd. As the physical size of the rfid chip is reduced, these difficulties in assembling a properly functioning ID tag, and the assembly cost, increase accordingly.

FIG. 2 illustsrates one recent approach made in the art to eliminate the difficulties in assembling an ID tag having separate rfid chip and antenna components. As seen in this FIG., an ID tag 20 is fabricated with an integrally formed rfid chip 22 and antenna 24 on a substrate 25. Because the antenna 24 is formed along with rfid chip 22 during the chip fabrication process, an ohmic connection is automatically created between the rfid chip 22 and the free ends of antenna 24. This "coil-on-a-chip" approach eliminates the costly bonding step and the difficulties associated therewith. bonding of discrete components in the ID tag assembly process, it introduces a severe limitation on the effective operating range of an ID tag fabricated according to this technique. Since the "coil-on-a-chip" ID tags are fabricated using integrated circuit batch processing techniques, the size of the antenna is extremely limited to the size of the dies produced. For example, the published operating range of one commercially available "coil-on-a-chip" ID tag is limited to a maximum distance of 3.0 mm. While this may be adequate for some specialized applications, such a small operating range is unsuitable for the majority of applications currently envisioned for ID tags.

One attempt to extend the operating range of a "coil-on-a-chip" ID tag is disclosed in U.S. Pat. No. 6,268,796 issued Jul. 31, 2001 for "Radio Frequency Identification Transponder Having Integrated Antenna", the disclosure of which is hereby incorporated by reference. According to the teachings of this reference, an antenna is formed on a chip which is mounted above or below the rfid chip. The antenna has a number of coil turns which together constitute a helical coil whose axis is parallel to the major body plane of the rfid chip. To increase the inductance of the antenna coil, and thus the operating range of the ID tag, a high magnetic permeability layer is formed on the antenna chip. While this configuration does increase the operating range of a "coil-on-a-chip" ID tag, it requires several additional processing steps, which increase the fabrication cost and potentially affect the yield, and only provides an antenna with a relatively small area.

Thus, current "coil-on-a-chip" RFID tags still suffer from the severe disadvantage of a limited effective operating range with the associated interrogation/reader device.

SUMMARY OF THE INVENTION

The invention comprises a method and system for providing a "coil-on-a-chip" RFID tag with an increased operating range over known ID tags of comparable dimensions.

From an apparatus aspect, the invention comprises an RFID tag comprising a substrate; and an rfid chip/antenna combination integrally formed on the substrate. The rfid chip has a major body plane essentially parallel to the plane of the substrate, The antenna comprises a coil having a plurality of layers of electrically conductive turns defining a central opening enveloping an axis of revolution arranged at an angle with respect to the major body plane of the rfid chip, and a core of magnetically permeable material positioned within the central opening of the coil. In the preferred embodiment, the coil has an essentially helical configuration with at least two layers, the angle is substantially ninety degrees, and the core has an annular shape.

From a process aspect, the invention comprises a method of preparing an RFID tag comprising the steps of:

(a) providing a substrate;

(b) forming contemporaneously an rfid integrated circuit and an antenna coil on the substrate, the coil being formed as a multi-turn multi-layer coil having a central opening with an axis of revolution distending an angle with respect to the major body plane of the rfid integrated circuit; and (c) providing a core of magnetically permeable material positioned within the central opening of the coil.

The steps of (b) forming and (c) providing are performed contemporaneously. The step (b) of forming preferably includes the step of forming the coil with an axis of revolution distending an angle of substantially ninety degrees with respect to the major body plane of the rfid integrated circuit. The core is formed as an annulus.

The invention affords all of the advantages of a "coil-on-a-chip" ID tag but provides a much greater operating range than known devices. This increased operating range is estimated to be a factor of ten greater than known "coil-on-a-chip" ID tags.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
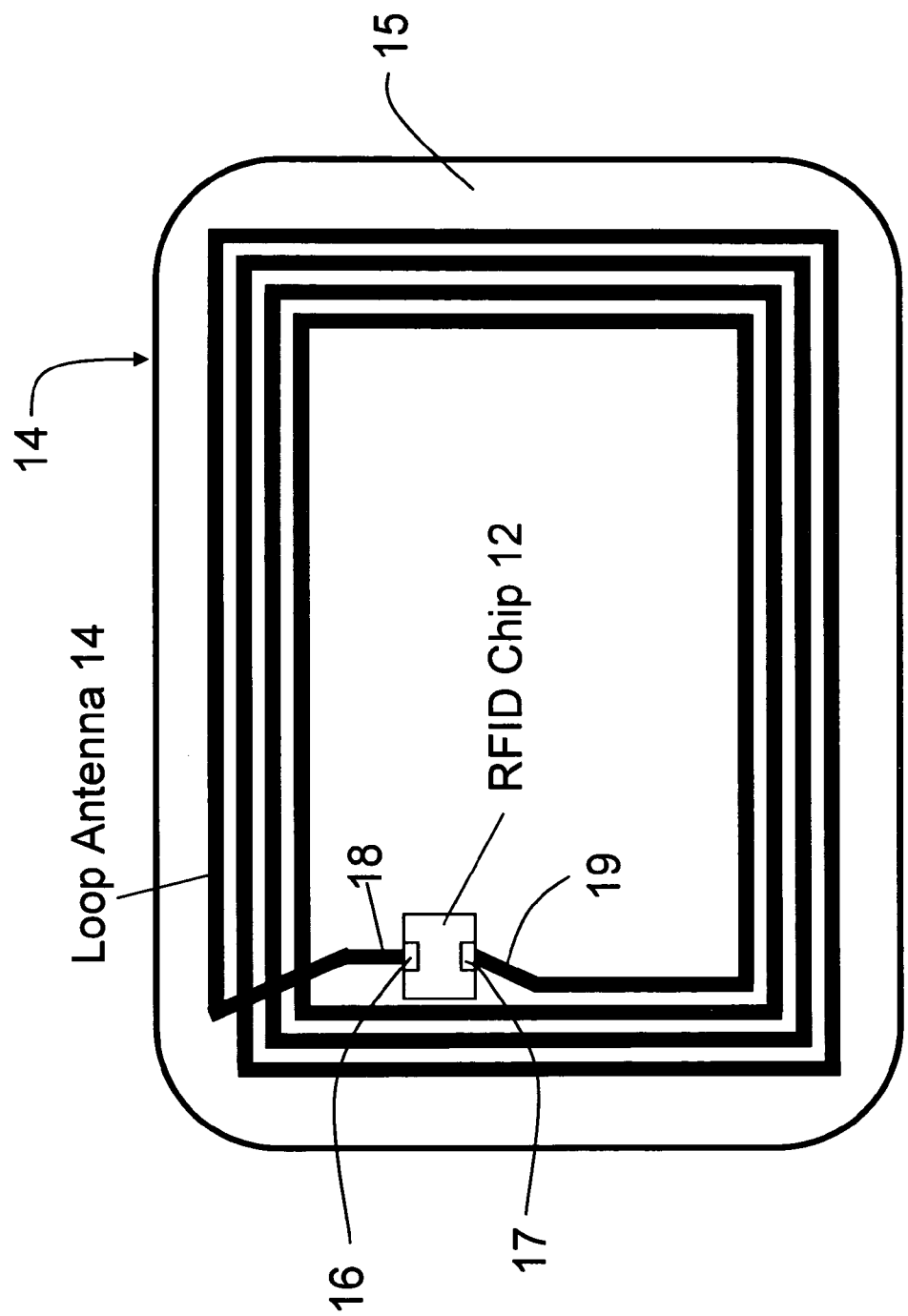
FIG. 1 is a plan view of a prior art ID tag having an rfid chip and a separate antenna.
Figure 2:
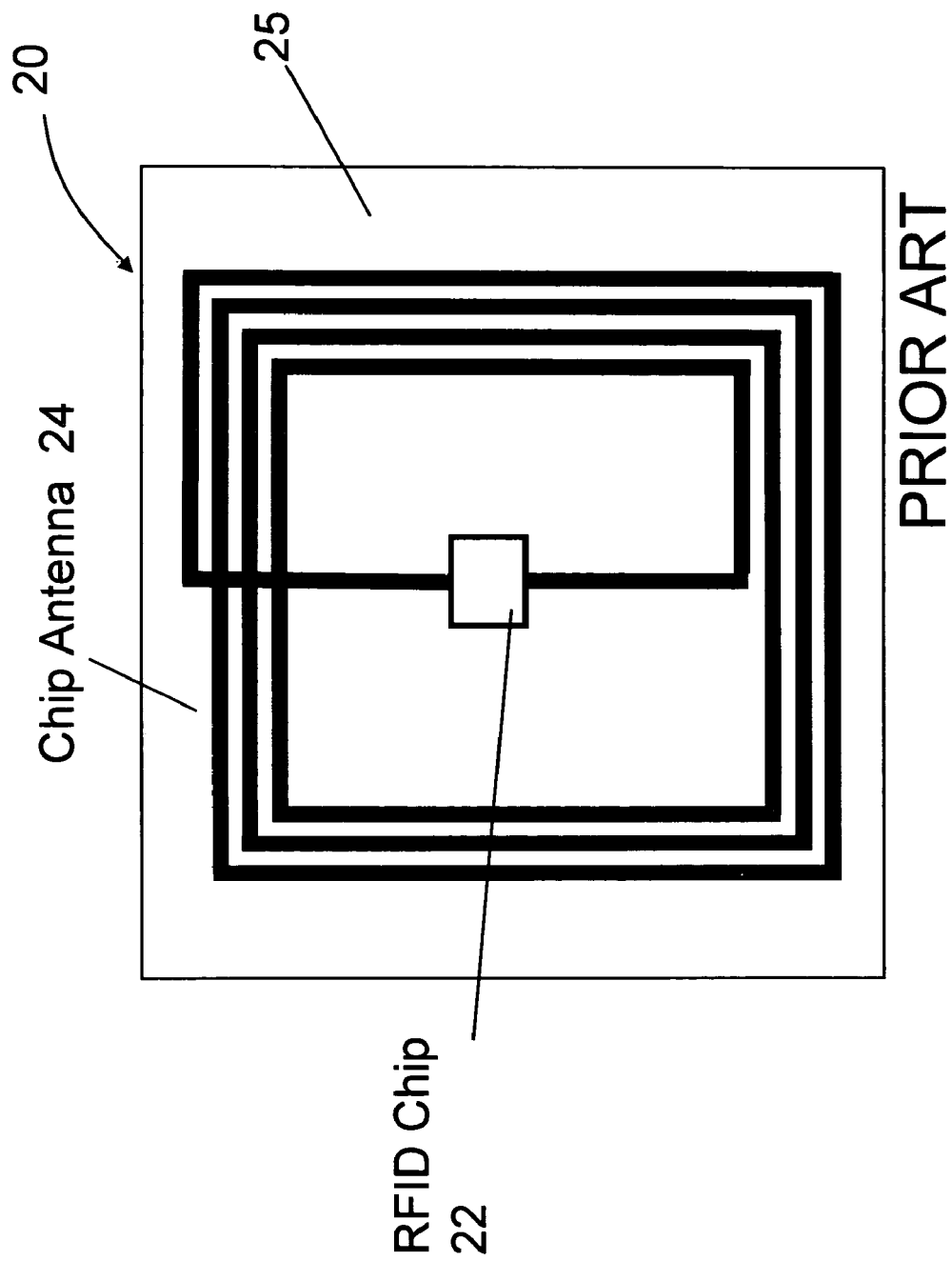
FIG. 2 is a plan view of a prior art ID tag having an rfid chip and an integrally formed antenna.
Figure 3:
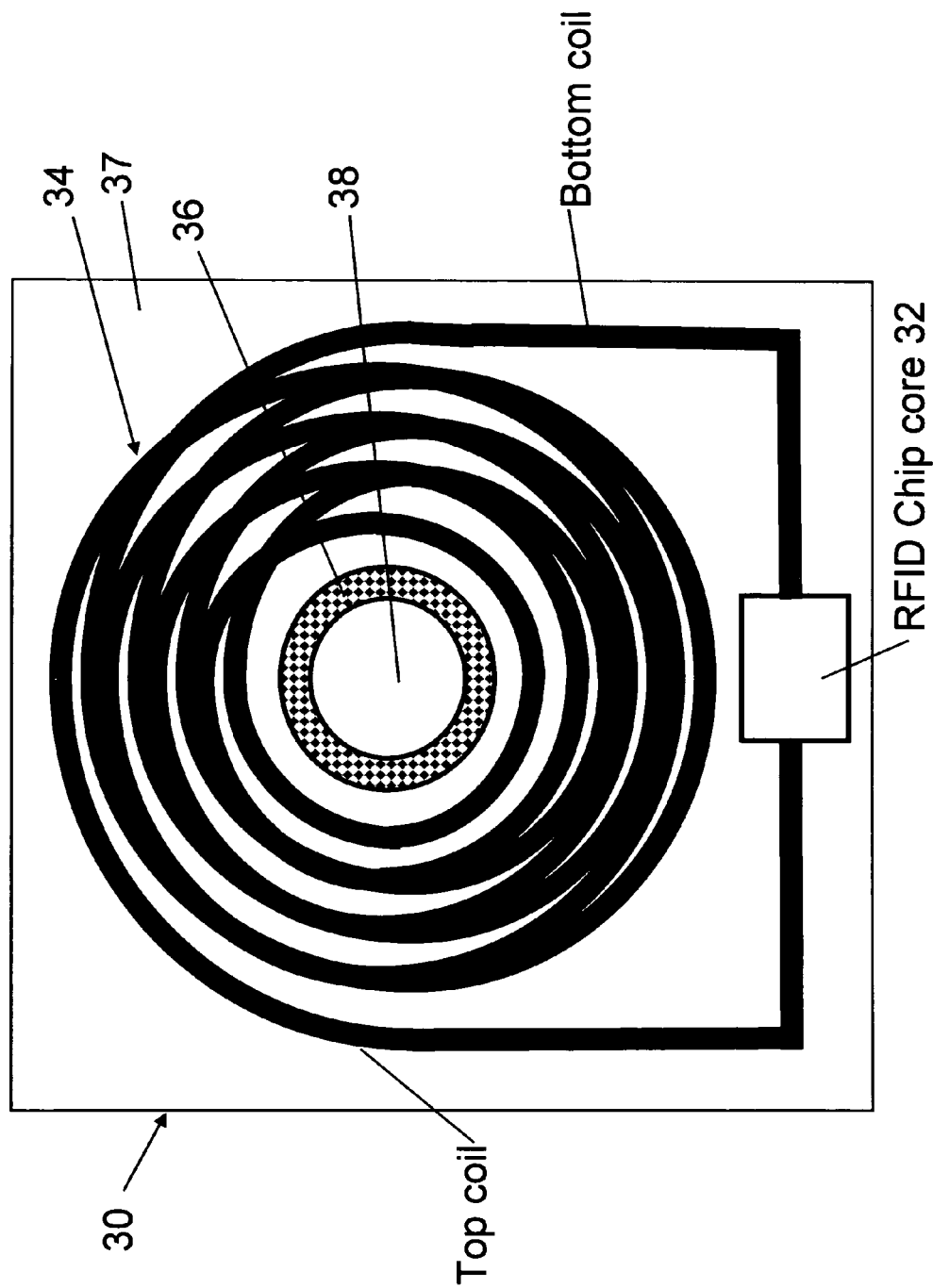
FIG. 3 is a plan view of an ID tag having an rfid chip and an integrally formed antenna according to the invention.
Figure 4:
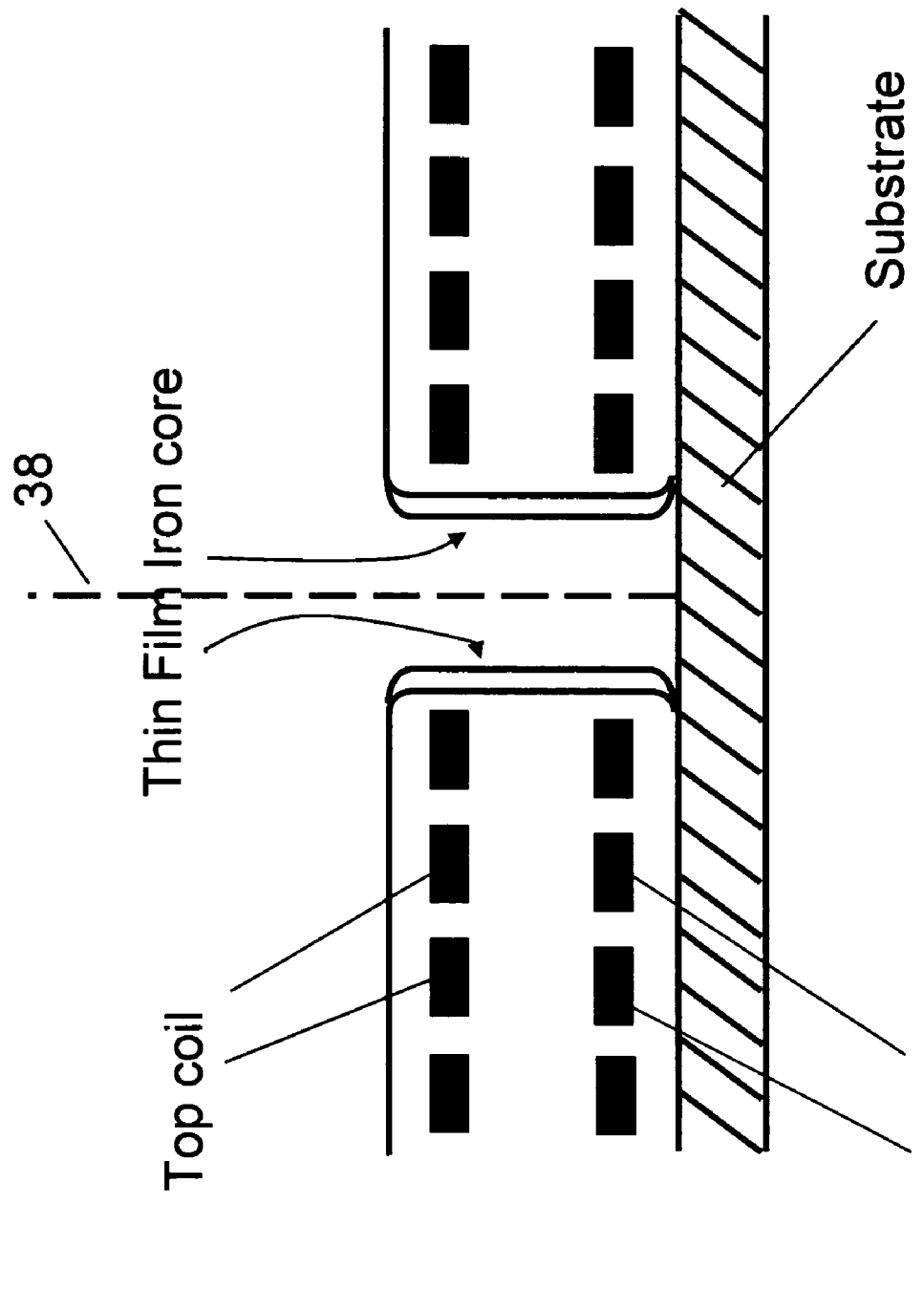
FIG. 4 is a sectional view taken along lines 4-4 of FIG. 3 illustrating the multiple layer, multi-turn antenna coil.

Turning now to the drawings, FIG. 3 is a top plan view of a preferred embodiment of the invention, and FIG. 4 is a sectional view taken along lines 4-4 of FIG. 3 illustrating the multiple coil turns and multiple coil layers, and the magnetically permeable layer of the antenna of the preferred embodiment. As seen in these FIGS., an RFID tag 30 comprises an rfid chip 32 and a multiple layer, multiple turn antenna coil 34 having a centrally located thin film core 36 fabricated from a material having relatively high magnetic permeability. Rfid chip 32, coil 34, and core 36 are all carried by a substrate 37. Rfid chip 32 has a major body plane, defined as the plane parallel to the major support surface of substrate 37. Multiple layer, multiple turn antenna coil 34 has a central axis of revolution 38 which is oriented at an angle, preferably about 90 degrees, with respect to the major body plane of rfid chip 32.

As best seen in FIG. 4, thin film core 36 is formed as an annulus which extends upwardly from the top surface of substrate 37 to the upper surface of coil 34 in the region interior to the layers and turns of coil 34. Thin film core 36 may be formed from any one of a number of known materials possessing the property of relatively high magnetic permeability. One such material is a nickel-iron alloy composed of 81% nickel, 19% iron. Other suitable materials will occur to those skilled in the art. The purpose of core 36 is to increase the Q factor of coil 34, and thus the operating range of ID tag 30.

The operating range of ID tag 30 is also improved by the provision of multiple layers and multiple turns for coil 34, as well as the spatial orientation of coil 34 in a direction in which the axis of revolution of coil 34 is arranged at an angle, shown as essentially ninety degrees, with respect to the major body plane of rfid chip 32.

ID tag 30 is fabricated using the known techniques for manufacturing a "coil-on-a-chip" ID tag. Thus, the several layers of rfid chip 32, multiple layer, multiple turn coil 34, and core 36 are contemporaneously created using known deposition, masking, doping and etching techniques.

ID tags fabricated according to the teachings of the invention enjoy the advantages afforded by "coil-on-a-chip" ID tags-principally, the elimination of the bonding step involving the antenna coil and the rfid chip, and the cost benefits of large volume batch processing-while offering an increased operating range, estimated to be a factor of ten greater than known "coil-on-a-chip" ID tags.

While the invention has been described with reference to a particular preferred implementation, various modifications, alternate constructions and equivalents may be employed without departing from the spirit of the invention. For example, while coil 34 has been illustrated and described as a coil having two layers of multiple turns, it is envisioned that multiple turn coils having three or more layers can readily be implemented, as desired. Further, as noted above, core 36 may be fabricated from other materials than the particular material described. Therefore, the above should not be construed as limiting the invention, which is defined by the appended claims.

What is claimed is:

1. An RFID tag comprising:
   a substrate with an upper surface;
   an rfid chip/antenna combination integrally formed on said upper surface of said substrate,
   said antenna comprising a coil having a plurality of layers of electrically conductive turns defining a central opening enveloping an axis of revolution arranged at an angle with respect to said substrate, each layer having a plurality of electrically conductive turns, and
   a core of magnetically permeable material positioned within said central opening of said coil and extending away from said upper surface of said substrate into said central opening towards the uppermost one of said plurality of layers of said coil.

2. The invention of claim 1 wherein said angle is substantially ninety degrees.

3. The invention of claim 1 wherein said coil has an essentially helical configuration with at least two layers.

4. The invention of claim 1 wherein said core has an annular shape with a hollow interior.

5. A method of preparing an RFID tag comprising the steps of:
   (a) providing a substrate with an upper surface;
   (b) forming contemporaneously an rfid integrated circuit and an antenna coil on said substrate, said coil being formed as a multi-turn multiple layer coil having a central opening with an axis of revolution subtending an angle with respect to said substrate, each layer having a plurality of electrically conductive turns; and
   (c) providing a core of magnetically permeable material positioned within said central opening of said coil and extending away from said upper surface of said substrate into said central opening towards the uppermost one of said plurality of layers of said coil.

6. The method of claim 5 wherein said steps of (b) forming and (c) providing are performed contemporaneously.

7. The method of claim 5 wherein said step (b) of forming includes the step of forming the coil with an axis of revolution subtending an angle of substantially ninety degrees with respect to said upper surface of said substrate.

8. The method of claim 5 wherein said core is formed as an annulus with a hollow interior.

* * * * *